Patented May 23, 1950

2,508,924

UNITED STATES PATENT OFFICE 2,508,924

BITUMEN-TREATING AGENT

Edward W. Mertens, Berkeley, and Don E. Stevens, Fairfax, Calif., assignors to California Research Corporation, San Francisco, Calif., a corporation of Delaware No Drawing. Application April 11, 1950, Serial No. 155,344

20 Claims. (Cl. 106—273)

The present invention relates to the preparation of bitumen-treating agents capable of imparting superior adhesion properties to bituminous substances and to mixtures of bituminous substances and mineral aggregate containing said agent, said mixtures being useful in road construction.

When employing a bituminous substance as a protective or binding material, as in road construction, a constant object sought in the art is the improvement of the bond between the bitumen and the material to be protected therewith or bound thereto. For example, in the art of constructing and repairing the surface of roads, highways, bridges and the like, it is desirable that the bitumen have a strong affinity for, and strongly adhere to, mineral aggregate. It is further desired that the bituminous substance coat the individual particles of aggregate thoroughly, uniformly and lastingly, and that the bond between the aggregate and the bituminous substance remain unimpaired regardless of weather and condition or type of aggregate.

For example, in the coating of paving aggregate with a bituminous substance for use in road construction or repair, the tendency of the bitumen to strip from the aggregate during rain or because of unfavorable moisture conditions is a most serious drawback. Such a drawback not only greatly shortens road life and increases maintenance costs, but in many instances makes it impossible to use locally occurring aggregates because of their abnormally severe stripping tendencies.

Numerous anti-stripping agents have accordingly been proposed for incorporation in bituminous substances which are to be admixed with aggregate to improve the bond between the bituminous substance and the aggregate. However, these agents while effective in one or more properties are deficient in one or more other properties. Some additives, although effective, are so costly or must be used in such large percentages that the use thereof is prohibitive. Other additives are effective when used with a particular type of aggregate but are substantially useless with other aggregates or under changing conditions. Certain other additives, although somewhat effective, deteriorate rapidly when stored under conditions often prevailing in the art. For example, it is common refinery practice to store the bitumen material at temperatures sufficiently high to maintain the bitumen material in flowable and pumpable form and to allow shipment of the material containing the anti-stripping agent to points within reasonable distances of the refinery without further heating. In order to accomplish these purposes, the bitumen may reach temperatures as high as 400° F. and higher. Heating the anti-stripping agent to such high temperatures causes a rapid deterioration thereof, and maintaining the anti-stripping agent at these high temperatures even further destroys the effectiveness thereof. It is thus desirable that a satisfactory anti-stripping agent have a high degree of thermal stability.

Although some additives may evidence a reasonable degree of heat stability, and may initially coat the aggregate in a passable manner, nevertheless they are ineffective to prevent gradual emulsification of water into the surface coating brought about by the continued impact of normal traffic. As a consequence, the road gradually deteriorates in a manner similar to that characteristic of bitumen - aggregate mixes, wherein too high a proportion of the bitumen binder is present.

A still further deficiency of certain additives is their gradual destruction or modification into materials of entirely unsatisfactory anti-stripping qualities.

Certain additive-treated mixes form satisfactory wearing courses if dry aggregate is used in the original mixing operation, and if the resultant mix is allowed to cure for a reasonable period before being subjected to inclement weather. However, these additive-treated mixes rarely effect a satisfactory coating with damp aggregate and frequently prove unsatisfactory when heavy rains fall prior to their being cured.

An object of the invention is to provide an all-purpose inexpensive anti-stripping agent.

Another object of the invention is to provide a bituminous substance treated with an anti-stripping agent capable of imparting improved properties of adhesion to the bituminous substance.

Yet another object of the invention is to provide a bituminous substance containing an anti-stripping agent capable of coating thoroughly and uniformly a wide variety of aggregate.

A further object of the invention is to provide a paving mixture of bituminous substance and aggregate containing an anti-stripping agent capable of effecting a lasting bond between the bituminous substance and the aggregate.

Another object of the invention is to provide a bituminous substance treated with additive capable of being used to coat wet aggregate.

Still a further object of the invention is to provide a paving mixture of aggregate, bituminous substance and anti-stripping agent capable of withstanding when laid the tendency of water to emulsify into the mix under the repeated impact of traffic.

Another object of the invention is to provide an anti-stripping agent retaining its essential chemical composition during prolonged use.

A further object of the invention is to provide a bituminous composition treated with an anti-stripping agent, which will retain good anti-stripping properties although subjected to elevated temperatures.

Other objects and advantages of the invention will be apparent from the following description of the invention.

Briefly, the present invention contemplates the preparation of the amido-amine salt of an organo-substituted inorganic acid, for example, lauryl phosphoric acid and the bringing together of a bitumen and aggregate in the presence of such salt. The salt product of the present invention is obtained by reacting a polyamine with an amidizing carboxylic acid under conditions such as to effect amidization of a portion of the amino groups to yield an intermediate amide product which is subsequently reacted with an organo-substituted inorganic acid under such conditions as to effect neutralization of free amino groups by the said acid to yield the amido-amine salt of an organo-substituted inorganic acid.

We have found that the salt product contemplated by the invention possessing two functional groups, one of which is an acyl-amido structure, and the other a salt structure, is capable of being used as a highly effective anti-stripping agent. The amido-amine salt product of the invention is capable of causing a tenacious bond between aggregate and bitumen, which bond perseveres regardless of weather conditions and conditions of use to which the composition of bitumen and aggregate may be subjected. By means of our anti-stripping agents, we may effectively coat not only dry aggregate, but also wet aggregate, as will hereinafter more fully appear. In addition, the additives contemplated by the present invention are capable of withstanding high temperatures without material deterioration.

As hereinbefore stated, the invention contemplates bituminous substances and/or mineral aggregate admixed with an anti-stripping agent obtained from the reaction of a polyamine and a carboxylic acid subjected to reaction conditions whereby to produce an intermediate partially amidized polyamine product, which product is subsequently reacted with a non-amidizing organo-substituted inorganic acid to obtain a final product containing in the molecule the amide functional group as well as the salt structure.

In the preparation of the partially amidized polyamine, an amount of acid is used insufficient to amidize the entire polyamine. In general, the product obtained from the interaction of the carboxylic acid and the polyamine is one in which there appears at least one amidized amino group and at least one or more free amino groups, one or more of which are later converted to the salt structure. The partially amidized intermediate product is then reacted or neutralized with the organo-substituted inorganic acid, and preferably an alkyl phosphoric or alkyl phosphonic acid, to yield the organo-substituted inorganic acid salt of the partially acylated polyamine.

In general, the reactions in the preparation of the desired product may be illustrated by the following illustrative equations:

(1) 

(2) 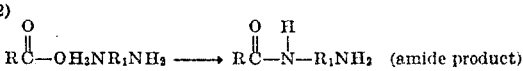

(3) 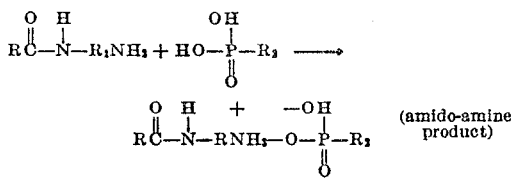

In the preparation of the amine soap, the amount of carboxylic acid preferably employed is sufficient to effect amidization of one-third to one-half of the amino groups present in the polyamine. In general, the minimum quantity of carboxylic acid used is one equivalent for each mole of polyamine, while the maximum concentration of carboxylic acid advantageously employed may equal the number of equivalents of polyamine less one. The number of equivalents of carboxylic acid used in the preferred range is approximately one-third to one-half of the equivalents of the polyamine.

The preparation of the intermediate amide product may be effected by heating and stirring a mixture of appropriate amounts of a polyamine, for example, diethylene triamine, and of a carboxylic acid, for example, stearic acid. Sufficient heating, with stirring, is employed to cause amidization and is continued until the reaction is complete. Temperatures employed to effect amidization generally reside within the range of about 225° to 400° F.

Since the reaction is a condensation reaction, the reaction is considered complete when water ceases forming. Completion of the reaction may be determined when there is no further accumulation of water as observed, for example, in an appropriately placed trap in the system.

After amidization, the neutralizing organo-substituted inorganic acid may be added to the intermediate amide product and mixed therewith. The temperatures that may be employed may vary from room temperatures to elevated temperatures. Such elevated temperatures are held below the decomposition point of the reactants and of the final amido-amine salt product. If desired, a diluent or solvent for the reactants of amide and salt-forming acid may also be employed. Upon completion of the salt-forming reaction, the resulting product may be used as such or after removal of part or all of the solvent or in otherwise purified form, for example, the product obtained after subjection of the reaction products to purification methods well known in the art, such as distillation, solvent extraction, etc.

In the preparation of the final amido-amine salt product of an organo-substituted inorganic acid, the intermediate amide product and the organo-substituted inorganic acid need not be present in stoichiometric proportions, an excess of one or the other being permissible. In general, satisfactory materials have been prepared by employing a mol ratio of amide to organo-substituted inorganic acid varying from about 1:5 to about 5:1.

The polyamines contemplated by the present invention are any organic compound containing at least two amino groups, or such similar groups, such as imino groups, at least one of which is capable of reacting with a carboxylic acid to yield an amide structure, and at least one of which is capable of forming a salt with an organo-substituted inorganic acid.

Polyamines comprehended by the invention include polyamines referred to in the art as cationic surface active materials, for example, 1,3-diamino octadecane, as well as those polyamines considered to be surface inactive materials. Of these latter materials may be mentioned polyamines having at least two terminal amino groups, which because of the terminal groups are essentially hydrophilic and are ordinarily considered to be relatively cation surface inactive materials, for example, ethylene diamine; polyamines which, regardless of the position of the amino groups, have terminal carbon chains with fewer than 12 carbon atoms contained therein, that is, terminal chains having a carbon content below the minimum considered to be necessary in such chains in order to impart surface activity to the molecule, for example, 2,5-diamino dodecane; and substantially cation surface inactive polyalkylene polyamines, such as pentamethylene diamine. In general, polyamines included within the scope of the invention may vary from polyamines containing two or more carbon atoms to polyalkylene polyamines containing 60 or more carbon atoms. In carrying out the invention, any polyamine is suitable which, when formed into the amido-amine salt, will result in a salt which may be dispersed in the bituminous material to form true solutions or more stable suspensions of the salt in the bituminous material.

Specific examples of polyamines are trimethylene diamine, pentamethylene diamine, phenylene diamine, tolylene diamine, histamine, methyl guanidine, triethylene tetramine, diethylene triamine, tetra-ethylene pentamine, guanidine, diguanide, N-methylamino aniline, decamethylene diamine, octadecyl diamine, hexamethyl trimethyl triamine, ethylene diamine, propylene diamine, kerosyl amine (obtained by chlorinating and then ammonolyzing kerosene stock), hexaethylene heptamine, polyethylene polyamine (molecular weight of approximately 1200), 1,3-diamino octadecane, etc.

The carboxylic acid employed to form the intermediate amide product may be any suitable organic carboxylic acid ranging from as low as formic acid to the higher carboxylic and polycarboxylic acids, derived, for example, from partial oxidation of waxes having about 30 or more carbon atoms in the molecule. These acids may be aliphatic, alicyclic and aromatic; saturated or unsaturated; unsubstituted and substituted, so long as the functional carboxyl radical remains unimpaired. Preferably employed are the fatty acids. Specific examples of suitable carboxylic acids are formic, acetic, propionic, butyric, caproic, capric, palmitic, oleic, ricinoleic, tartaric, mellitic, malonic, adipic, sebacic, phthalic, cyclopropionic, etc. Preferably employed are acids derived from vegetable oils, animal fats and waxes.

As will be appreciated by those skilled in the art, in place of the aforementioned acylating substances, we may employ other materials, well known to react with amines to form amides, for example, acid anhydrides, such as phthalic anhydride, and acyl chlorides, such as acetyl chloride.

The organo-substituted inorganic acids employed in accordance with the invention are acid-reacting materials capable of forming a salt with the partially amidized polyamines. These materials include acid-reacting organo-substituted inorganic acids, such as the acids of a weak acid-forming element, for example, boron or silicon; and organo-substituted acids of strong acid-forming elements, for example, phosphorus and sulfur. More preferably employed, however, are the organo-substituted acids of the strong acid-forming elements, such as sulfur, phosphorus and nitrogen.

In addition, the organo-substituted inorganic acids are such as to contain at least one free ionizable hydrogen capable of reacting with the free amine groups of the partially amidized polyamine to form the salt, and at least two carbon atoms in a chain. While organo-substituted inorganic acids containing two carbon atoms in the organic substituent of the acid are operative, we have found that organo-substituted inorganic acids having a higher carbon content give the best results. Accordingly, we prefer to employ organo-inorganic acids having a carbon chain of at least six carbon atoms. In general, these materials include compounds characterized by a direct carbon-to-acid-forming element bond, for example, a sulfonic acid; and compounds having the carbon and acid-forming element linked to an intermediate atom such as oxygen, for example, the monoesters of sulfuric acid.

As examples of general types of suitable inorganic acids containing an organic substituent may be mentioned acids of trivalent and pentavalent phosphorus; acids of tetravalent and hexavalent sulfur; acids of boron; carbonic acids; silicic acids, and acids of arsenic.

More specific types of the organo-substituted inorganic acids are the monoesters of sulfuric acid, the mono- and diesters of phosphorus, the mono- and diesters of phosphoric, orthoboric, arsonic, arsenious, arsenic, and orthocarbonic acids; phosphonous, phosphonic, sulfonic, sulfinous, sulfinic, boronic, arsinic, arsonic, stibonic and arsinous acids; such esters of the latter materials as do not deprive the compound of its acid-reacting nature or its ability to form salts with the partially amidized polyamine, for example, the monoester of phosphonic acid. The sulfur derivatives of the foregoing materials to yield thio compounds are not precluded, for example, mono- and di-thioesters of phosphoric acid.

The organic substituent of the inorganic acid may be alkyl groups, saturated, unsaturated or substituted; alkaryl, aryl, aryl-alkyl, cyclic non-benzenoid radicals; and oxygen-containing radicals, such as those in which the hydrogen of a hydroxyl group has been replaced by esterification, etherification, etc. The nature of these organic radicals is such that the salt of the partially amidized polyamine and organo-substituted acid is soluble in the bituminous substance or, in the absence of the formation of a true solution, may be stably suspended in the bituminous material. And by "bitumen-soluble" we mean that the salt is dispersible in the bitumen, whether true solutions or mere suspensions of salt in the bitumen are formed.

Specific examples of organo-substituted inorganic acids which may be employed in accordance with the invention are: Monolauryl sulfuric acid, palmito glyceryl sulfuric acid, wood turpentine sulfuric acid, monohexyl phosphoric acid; mono- and didodecyl, mono- and dicetylphenyl, mono- and tetradecyl, mono- and dioctadecyl, mono- and ditetradecylphenyl, mono- and dioctadecylphenyl esters of phosphorus and phosphoric acids; monododecyl, mononaphthenyl, monoamylphenyl, mono-tetradecylphenyl boric, xanthic and dithiolcarbonic acids; ethyl, propyl, butyl, amyl, hexyl, octyl, decyl, dodecyl, tetradecyl compounds of phosphonous, phosphonic, arsonic, arsonous, sulfinous, sulfinic acids; dodecane sulfonic, p-toluene sulfonic, octadecane sulfonic, tetradecane sulfonic, dodecyl benzene sulfonic, asphalt sulfonic acids; hexyl, octyl, decyl, dodecyl and tetradecyl compounds of arsonous acid; monodecyl, monododecyl, monocetyl propylarsonic acid; hexyl, octyl, decyl, tetradecyl, octadecyl esters of phosphonous and phosphonic acids; the reaction product obtained by nitrating a petroleum resin to form R—NO₂, wherein "R" refers to the petroleum resin, and which nitro petroleum resin tautomerizes to form a nitroxy acid

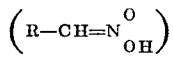

capable of reacting with the partially amidized polyamine to form the salt.

Preferably employed are the organo-substituted acids of phosphorus. As hereinabove indicated, these include acids of trivalent and pentavalent phosphorus, and, more specifically, phosphonous, phosphinous, phosphonic and phosphinic acids; the mono- and diesters of phosphoric acid; the monoesters of phosphonous and phosphonic acids, etc. In general, the organo-substituted acids of phosphorus mentioned in the copending application of Vaughn R. Smith et al., Serial No. 114,285, filed September 6, 1949, are suitable materials for purposes of the present invention.

In preparing the amido-amine salt product of the present invention, the ingredients of polyamine, amidizing acid, and organo-substituted inorganic acid are so selected as to give a final amido-amine salt product having at least 8, and preferably about at least 12 to 16, carbon atoms in the molecule and more, the upper limit as to carbon content of any one or more of the ingredients being such as to permit formation of stable dispersion of bitumen and amido-amine salt, whether true solutions of amido-amine salt product in the bituminous material or mere stable suspensions of the amido-amine salt in the bituminous material are formed.

The method of incorporation of the amido-amine salt contemplated by the invention in mixtures of aggregate and bituminous substance is not critical. Thus the pre-formed amido-amine salt may be added to the bituminous substance and/or to the aggregate prior to admixture of the two; or the amido-amine salt may be formed in situ on either the aggregate or in the bituminous substance or both; or the salt-forming elements of partially amidized polyamine and acid may be added separately to either or both bituminous substance and aggregate or combined in physical mixtures, in which event it is believed that the salt product is formed upon the migration of the salt-forming elements to the interface of aggregate and bituminous substance. By "amido-amine salt," therefore, it is intended to include the reaction product of the partially amidized polyamine and a non-amidizing acid, as well as mere physical mixtures of these two salt-forming elements.

In practicing this invention, the acylamido amine salt of an organo-substituted inorganic acid may be added to the bituminous substance before the latter is mixed with the aggregate or the aggregate may be separately treated with the aforesaid salt. In the event the salt is mixed first with the bituminous substance, it is sufficient merely to mix the two together with such heating and agitation as may be necessary to produce a homogeneous blend. When the aggregate is separately treated with the salt, the latter may be mixed with the aggregate as such or it may be dissolved in a solvent, for example, kerosene, before being mixed with the aggregate. It is also possible to mix the aggregate, the salt and the bituminous substance simultaneously.

In any case, the amido-amine salt need be used in only small amounts. Amounts ranging from about 0.05 to about 10 per cent by weight, preferably 0.1 to 2 per cent, of the bituminous substance when the salt is added to the bituminous substance have been found satisfactory; or about 0.001 per cent to about 1 per cent, preferably 0.01 to about 0.5 per cent, of the aggregate when the aggregate is treated separately with the salt.

The bituminous materials that may be employed in accordance with the invention are those employed in the construction and repair of roads, and are normally solid, semi-solid, or viscous liquids at ordinary atmospheric temperatures. Examples of suitable bituminous substances or bitumens are petroleum or native asphalt; pyrogenous distillates, such as oil-gas tar, coal tar; pyrogenous residues, such as blown asphalts, sludge asphalts, pressure tars, tar pitch; pyrobitumens, etc. In addition, mixtures of the foregoing materials, as well as mixtures or solutions of the aforesaid materials with solvents, such as naphtha, kerosene and stove oils, to give so-called liquid asphalts are also contemplated by the invention.

Of the foregoing materials, petroleum asphalt produced by steam-refining, by air-blowing, by solvent extraction methods, or by a combination of such methods, and having penetration values of about 30 to about 400 according to ASTM D-5-25 Method, is most advantageously used. Also, but less desirably, oil-in-water type emulsions of these and other bituminous materials may be used. Such emulsions can be prepared by methods well known in the art; and the emulsions may be of the quick-breaking or penetration type or more stable type emulsions, such as slow-breaking or a mixing type emulsion.

When the bituminous substance is present in the continuous phase, as in unemulsified asphalts, cut-backs and road oils, it is preferred to add the amido-amine salt to the bituminous substance. When the bituminous substance is emulsified in water, the salt is preferably added to the aggregate.

As hereinabove stated, the amido-amine salts herein contemplated need not be added to the bitumen and/or to the aggregate in pure form. For example, in the event a diluent, for example, kerosene for any of the reactants is employed, upon formation of the final product the diluent need not be removed from the reaction product prior to its use with the bitumen, sufficient amount of the material being used as to give the calculated desired amount of additive in the finished product.

In order to evaluate the effectiveness of anti-stripping agents, certain tests have been devised to determine certain properties desired in a suitable anti-stripping agent. Thus, the Nicholson film stripping test, described in the publication "Proceedings of Asphalt Paving Technologists," January, 1932, page 43, measures the degree of retention of a bituminous film by aggregate subjected to the stripping action of water after an artificial curing period. By comparing film retention data obtained from a bituminous substance, such as a road oil, treated with the additive under test and a blank, that is, the bituminous substance containing no additive, it is possible to estimate the degree of effectiveness of a given anti-stripping additive.

The test employed to measure film retention of the amido-amine salt products herein contemplated and the one utilized in obtaining the data hereinbelow appearing is a modified Nicholson film retention test and is run as follows:

The additive is blended into an MC-2 liquid asphalt in an amount of 1 per cent. The mixture of additive and asphaltic material is then placed in an oven at 140° F. overnight to insure uniform dispersion of the additive throughout the asphaltic material. Then 47.5 g. of aggregate, which passes a ⅜-inch screen and is retained on a No. 8 screen, is mixed with 2.7 g. of the treated liquid asphalt. After the aggregate has become uniformly coated, the mixture is allowed to cure overnight in an oven at 140° F. The cured sample is placed in an 8-ounce screw-capped glass jar with 175 ml. of distilled water at 140° F. and tumbled in the water jar at 45–50 revolutions per minute for 15 minutes at a temperature of 120° F. The sample is then examined, the percentage of film retained upon the surface of the aggregate is estimated, and the results are recorded. In carrying out the test, three standard aggregates are employed, namely, limestone, an easily coated aggregate; silica, a hydrophilic aggregate, and therefore difficult to coat; and rhyolite, which is also difficult to coat.

Another test employed in obtaining the data hereinbelow appearing is the under-water coating test. This test has for its object the determination of the ability of an additive-treated bituminous substance to coat wet aggregate, and involves stirring a water-immersed aggregate through a slick of MC-2 liquid asphalt, and then estimating the percentage of aggregate covered with the asphalt. The test is performed as follows:

47.5 g. of the aggregate are covered with 100 cc. of distilled water. There is then added to the water 2.7 g. of the asphaltic material containing 1 per cent of the additive. The asphaltic material is then stirred through the aggregate for approximately 1 minute, after which the aggregate is examined and the percentage area thereof coated with asphaltic material estimated. In carrying out the test, the three standard aggregates of silica, limestone and rhyolite are employed.

Conventionally, any aggregate retaining less than 70 per cent of film, whether subjected to the Nicholson film stripping test or to the under-water coating test, hereinabove described, is considered to have failed the tests.

The following examples illustrate the practice of the invention.

*Example I*

(a) 26 g. of anhydrous diethylene triamine was added to 71 g. of stearic acid previously heated to about 195° F. Heating was continued until homogeneity of the mixture was achieved, and the amine salt was obtained.

(b) The amine salt was further heated to about 375° F., whereupon water was gradually removed from the reaction mixture and caught in a trap especially provided for the purpose in the reflux apparatus. Reaction was deemed complete when the level of water in the trap no longer rose. A partially amidized product was accordingly obtained.

(c) The partially amidized polyamine produced in (b) was then cooled to about 220° F. and neutralized with 63 g. of lauryl phosphoric acid to give the final salt-amide compound.

Film stripping and under-water coating tests were obtained by adding 1% of the final product from (c) to an MC-2 liquid asphalt and then tested according to the procedures described above. Figures are given in per cent film retention:

| Nicholson Film Stripping | | | Under-Water Coating | | |
|---|---|---|---|---|---|
| Limestone | Silica | Rhyolite | Limestone | Silica | Rhyolite |
| 100 | 100 | 100 | 100 | 100 | 100 |

*Example II*

(a) 26 g. of anhydrous diethylene triamine was added to 114 g. of myristic acid and thoroughly stirred to give the amine salt.

(b) The salt product obtained in (a) was heated to about 375° F. as in the previous example to obtain the partially amidized product.

(c) After completion of the amidization reaction in (b), the amide-amine product was neutralized with 140 g. of cetyl phosphonic acid, and the mixture heated to obtain complete homogeneity. The resulting material gave the following results:

| Nicholson Film Stripping | | | Under-Water Coating | | |
|---|---|---|---|---|---|
| Limestone | Silica | Rhyolite | Limestone | Silica | Rhyolite |
| 100 | 100 | 100 | 100 | 100 | 90 |

*Example III*

(a) 86 g. of a water solution containing 70 per cent ethylene diamine was added to 282 g. of oleic acid and the mixture stirred vigorously to effect complete neutralization to the salt product.

(b) The salt reaction product from (a) was heated to about 375° F. to obtain the amide.

(c) The amide-amine product from (b) was further neutralized with 130 g. of ethyl sulfonic acid, with vigorous stirring and heating to yield the amido-amine salt product.

One per cent of the final salt amide product was added to MC-2 liquid asphalt and the resultant treated liquid asphalt was tested to give the following Nicholson film stripping and under-water coating results:

| Nicholson Film Stripping | | | Under-Water Coating | | |
|---|---|---|---|---|---|
| Limestone | Silica | Rhyolite | Limestone | Silica | Rhyolite |
| 90 | 80 | 90 | 80 | 80 | 80 |

*Example IV*

The amide-amine product of Example I(b) was neutralized with 380 g. of the petroleum nitroxy acid hereinabove described and the resultant salt-amide product was added in 1 per cent concentration to MC-2 liquid asphalt. Film retention results were as follows:

| Nicholson Film Stripping | | | Under-Water Coating | | |
|---|---|---|---|---|---|
| Limestone | Silica | Rhyolite | Limestone | Silica | Rhyolite |
| 80 | 100 | 90 | 90 | 100 | 80 |

Example V (a) 144 g. of octamethylene diamine was added to 60 g. of glacial acetic acid with stirring to give the salt.

(b) The product from (a) was heated to about 375° F. until amidization was substantially complete.

(c) The product from (b) was neutralized with about 160 g. hexyl phosphonic acid with stirring and mild heating, after which it was added to MC-2 liquid asphalt in a concentration of 1 per cent, and the film stripping and under-water coating results of the treated liquid asphalt were found to be as follows:

| Nicholson Film Stripping | | | Under-Water Coating | | |
|---|---|---|---|---|---|
| Limestone | Silica | Rhyolite | Limestone | Silica | Rhyolite |
| 80 | 90 | 90 | 90 | 90 | 90 |

Example VI 26 g. of anhydrous diethylene triamine was added to 142 g. of stearic acid which had previously been heated to about 195° F. The reaction mixture was further heated and stirred to insure complete homogeneity to form the di-salt of the amine. Heating was then continued to about 375° F. until amidization was observed to be complete.

The di-amide product resulting from this reaction was neutralized at about 220° F. with 63 g. of lauryl phosphoric acid to give the final di-amide-salt product.

About 1 per cent of this product was added to MC-2 liquid asphalt, and the film stripping and under-water coating effects determined to be as follows:

| Nicholson Film Stripping | | | Under-Water Coating | | |
|---|---|---|---|---|---|
| Limestone | Silica | Rhyolite | Limestone | Silica | Rhyolite |
| 90 | 80 | 80 | 90 | 90 | 90 |

Example VII 10.3 parts of diethylene triamine was mixed with 24 parts of capric acid while heating and stirring. Heating was continued until a temperature of about 375° F. was reached. When water no longer accumulated in the trap, the reaction was deemed complete.

The product resulting from the foregoing reaction was neutralized with 14 parts of myristic phosphonic acid to obtain the dicapryl amido-diethylene triamine salt product of myristic phosphonic acid. The Nicholson film stripping and under-water coating results were as follows:

| Nicholson Film Stripping | | | Under-Water Coating | | |
|---|---|---|---|---|---|
| Limestone | Silica | Rhyolite | Limestone | Silica | Rhyolite |
| 90 | 80 | 80 | 90 | 90 | 90 |

Example VIII (a) About 716 g. of glyceryl monostearate and 62 g. of boric acid were heated to a temperature of about 250° F. for about 15 to 20 minutes.

(b) Approximately 10 parts of diethylene triamine and 30 parts of tall oil were heated to a temperature between 350 and 375° F. until water ceased evolving.

(c) About 50 parts of the product obtained in (a) and 50 parts of the product from (b) were mixed while heating to a temperature of 250° F. until the mixture was homogeneous.

The product from (c) in 1 per cent concentration in MC-2 liquid asphalt gave the following film retention and under-water coating results:

| Nicholson Film Stripping | | | Under-Water Coating | | |
|---|---|---|---|---|---|
| Limestone | Silica | Rhyolite | Limestone | Silica | Rhyolite |
| 100 | 90 | 90 | 90 | 90 | 90 |

Example IX

Approximately 30 g. of glacial acetic acid and 138 g. of 1,3-diamino octadecane were heated to a temperature of about 275° F. until the evolution of water ceased. The resulting amide product was then mixed with about 90 g. of hexyl phosphoric acid and heated until the mixture was homogeneous. The final amido-amine salt product in 1 per cent concentration in MC-2 liquid asphalt gave the following film retention and under-water coating results:

| Nicholson Film Stripping | | | Under-Water Coating | | |
|---|---|---|---|---|---|
| Limestone | Silica | Rhyolite | Limestone | Silica | Rhyolite |
| 80 | 90 | 80 | 80 | 80 | 80 |

In addition to the property of good film retention with wet or dry aggregate, our anti-stripping agents also possess the valuable property of heat stability. As hereinabove discussed, it is highly desirable that an anti-stripping agent be able to withstand the deteriorating effects of heat. Mixtures of bitumen and anti-stripping agent may be subjected to elevated temperatures during storage or during shipping to some distant location. It is therefore desirable that the anti-stripping agent maintain its effectiveness in spite of the high temperatures which may prevail during storage or shipping.

The data tabulated below illustrate the ability of our agents to withstand high temperatures. Various anti-stripping agents were added in 1 per cent concentrations to MC-2 liquid asphalt, and the resulting mixture was held at 200° F. Heat stability of the various additives was determined by noting the time, expressed in days to failure, after which the additive-treated mixture when mixed with limestone, silica, and rhyolite gave a mixture failing the Nicholson film stripping test, that is, gave values less than 70 per cent film retention. The various additives employed and the days to failure are tabulated below:

| No. | Additive | Days to Failure |
|---|---|---|
| 1 | Cetyl phenolic salt of diethylene triamine | 11 |
| 2 | Cetyl phosphonic acid salt of octadecylamine | 25 |
| 3 | Tall oil acid salt of partially-amidized diethylene triamine. | 5 |
| 4 | Cetyl phosphonic acid salt of partially-amidized diethylene triamine (partially-amidized diethylene triamine same as in No. 3). | 28 |

It will be noted from the table that of the four additives subjected to the heat stability test, only additive No. 2 gave comparable heat stability results (25 days) with additive No. 4 (28 days). The former additive, however, although relatively heat stable, is inferior in coating wet aggregate. Additive No. 4, on the other hand, when subjected to the same test under like conditions gave 100 per cent film retention on all three aggregates.

We are aware of the fact that certain acylamido amine salt products of volatile, water-soluble acids have been proposed as anti-stripping agents. However, we have found that our products comprising the acylamido amine salts of organo-substituted inorganic acids for the most part non-volatile and substantially water-insoluble are far more effective anti-stripping agents.

To illustrate, the oleylamide of diethylene triamine was prepared employing about 280 g. of oleic acid and 115 g. of diethylene triamine. The oleylamide of the partially amidized diethylene triamine was then reacted with the acids listed below to give the oleylamide amine mono-salt of the acid, the acids employed being of commercial grade. Following the preparation of the amido-amine salt, the salt was mixed with MC-2 liquid asphalt in an amount of 1 per cent based on the asphalt. The treated asphalt was then subjected to the Nicholson film stripping test hereinabove described, employing limestone as the aggregate, a normally easily coated aggregate. The data and results are given below:

*Oleylamide-diethylene triamine salt*

| Acid | Amount Acid in grams | Nicholson Film Stripping (Limestone) Per Cent Film Retention |
|---|---|---|
| Phosphoric | 33 | 30 |
| Sulfuric | 49 | 30 |
| Hydrochloric | 27 | 40 |
| Acetic | 60 | 30 |
| Formic | 46 | 30 |
| Ethyl sulfonic | 45 | 70 |
| Hexyl phosphoric | 83 | 70 |
| Hexyl sulfonic | 165 | 70 |
| Myristyl sulfonic | 270 | 90 |
| Lauryl phosphonic | 125 | 100 |
| Cetyl phosphoric | 155 | 100 |

When the amounts of the various acids were doubled to give the di-salt by neutralization of the two remaining free amino groups of the partially amidized diethylene triamine, comparable results with those given above were obtained.

From the foregoing table it can be seen that the salts contemplated by the invention prepared with organo-substituted inorganic acids give results superior to those obtainable from the use of unsubstituted inorganic and organic acids. Further illustrative of this phenomenon is the following example, wherein silica was employed as the aggregate in the Nicholson film stripping test: Just sufficient capric acid was reacted with diethylene triamine to amidize about one-third of the amino groups. A portion of the resulting capramide was treated with sufficient sulfuric acid to neutralize the remaining amino groups to give the capramide diethylene triamine salt of sulfuric acid. The other portion of partially-amidized diethylene triamine was treated with methyl-ethyl sulfonic acid in such proportions to just neutralize the remaining amino groups to give the neutral amido-amine salt. Each amido amino salt was then separately mixed with a separate sample of MC-2 liquid asphalt in an amount of 1% based on the asphalt. Each sample of liquid asphalt treated with the appropriate amido-amine salt was then subjected to the Nicholson film stripping test, employing silica as the aggregate. The value obtained with the sample containing the salt prepared with sulfuric acid was 50%; the value obtained with the sample containing the salt prepared with methyl-ethyl sulfonic acid was 100%.

In another test the acetylamide of diethylene triamine was prepared, an amount of acetic acid having been employed sufficient to amidize about one-third of the amino groups of the diethylene triamine. After the preparation of the partially amidized polyamine the different acids listed below were separately employed in an amount sufficient to neutralize about one-half of the remaining amino groups to give the mono-salt. The finished amido-amine salt was then added to MC-2 liquid asphalt in an amount of 1%. Nicholson film retention results were then obtained employing the limestone as the aggregate.

*Acetylamide-diethylene triamine salt*

| Acid | Nicholson Film Stripping, Per cent Film Retention, Limestone |
|---|---|
| Phosphoric | 40 |
| Sulfuric | 30 |
| Hydrochloric | 40 |
| Acetic | 20 |
| Formic | 20 |
| Ethyl sulfonic | 70 |
| Hexyl phosphoric | 70 |
| Hexyl sulfonic | 70 |
| Myristyl sulfonic | 80 |
| Lauryl phosphonic | 100 |
| Cetyl phosphoric | 100 |

The di-salts of the acetylamido amines were also prepared by employing about twice the amount of the acids shown above. Film retention results were comparable to those obtained with the mono-salt. These data show that the neutralizing organo-substituted inorganic acids of the invention are equally as effective whether a high or low molecular weight acylating agent is employed in the preparation of the acylamido amine. In both instances unsubstituted inorganic or organic acids are incapable of producing satisfactory results, as can further be illustrated by the following example, wherein rhyolite was selected as the aggregate in the Nicholson film stripping test: Just sufficient acetic acid was reacted with ethylene diamine to amidize one-half of the amino groups. About one-half of the resulting partially amidized ethylene diamine was treated with just sufficient phosphoric acid to neutralize the remaining amino groups. The other half of the partially amidized ethylene diamine was treated with just sufficient ethyl phosphoric acid to neutralize the remaining amino groups to form the amido-amine salt of ethyl phosphoric acid. Each salt was then mixed separately with a separate sample of MC-2 liquid asphalt in an amount of 1% based on the asphalt. Film stripping results obtained in accordance with the Nicholson test herein described were then determined employing rhyolite as the aggregate. The amido-amine salt prepared with phosphoric acid gave a value of 10%; the sample prepared with ethyl phosphoric acid gave a value of 50%.

From the data herein appearing, the anti-stripping agents contemplated by the present invention may be considered as all-purpose anti-stripping agents. These agents coat dry and wet aggregates effectively, and, moreover, are heat stable. Other known additives, while showing one or more good properties, fail in other respects and therefore lack the general utility possessed by the anti-stripping agents herein described.

This application is a continuation-in-part of our copending application Serial No. 123,782, now abandoned, which in turn is a continuation-in-part of application Serial No. 92,509, now abandoned.

Obviously, many modifications and variations of the invention as hereinbefore set forth may be made without departing from the spirit and scope thereof, and therefore only such limitations should be imposed as are indicated in the appended claims.

We claim:

1. An improved bonding bituminous composition consisting essentially of a bituminous substance normally possessing stripping tendencies and, intimately dispersible therein, a small amount sufficient substantially to lessen stripping of said bituminous substance, of the salt of an acylamido amine having at least one free amino group and an organo-substituted inorganic acid having at least one free ionizable hydrogen and at least 2 carbon atoms, said salt having at least 8 carbon atoms in the molecule.

2. A composition substantially as described in claim 1, wherein the said organo-substituted inorganic acid has at least 6 carbon atoms.

3. A composition substantially as described in claim 1, wherein the bituminous substance is asphalt and the salt has at least 12 carbon atoms.

4. A composition substantially as described in claim 1, wherein the organo-substituted inorganic acid has at least 6 carbon atoms, and the salt has at least 12 carbon atoms.

5. A composition substantially as described in claim 1, wherein the salt is present in an amount of about 0.1 to about 2 per cent by weight of the bituminous substance.

6. A composition substantially as described in claim 1, wherein the acid is an acid of nitrogen.

7. A bituminous composition substantially as described in claim 1, wherein the organo-substituted inorganic acid is characterized by a direct carbon-to-acid-forming-element bond.

8. A composition substantially as described in claim 7, wherein the acid is an acid of sulfur.

9. A composition substantially as described in claim 8, wherein the bituminous substance is asphalt.

10. A bituminous composition substantially as described in claim 7, wherein the acid is an organo-substituted acid of phosphorus having at least 6 carbon atoms, and the salt has at least 12 carbon atoms.

11. A bituminous composition substantially as described in claim 10, wherein the phosphorus is pentavalent phosphorus.

12. A bituminous composition having superior anti-stripping properties consisting essentially of a bitumen normally possessing stripping tendencies and, intimately dispersible therein, a small amount sufficient substantially to lessen stripping of said bitumen of the salt of an acylamido amine having at least one free amino group and an organo-substituted inorganic acid having at least one free ionizable hydrogen and at least 2 carbon atoms, said carbon atoms being linked to the acid-forming element of said acid through an intermediate atom, and said salt having at least 8 carbon atoms.

13. A composition substantially as described in claim 12, wherein the intermediate carbon atom is oxygen.

14. A composition substantially as described in claim 13, wherein the acid is an acid of sulfur.

15. A composition substantially as described in claim 13, wherein the organo-substituted inorganic acid has at least 6 carbon atoms and the salt has at least 12 carbon atoms.

16. A composition substantially as described in claim 15, wherein the acid is an acid of phosphorus and the bituminous substance is asphalt.

17. A composition substantially as described in claim 15, wherein the phosphorus is pentavalent phosphorus.

18. A bituminous road construction composition consisting essentially in intimate combination, of mineral aggregate and a bitumen containing about 0.05 to 10 per cent by weight of the bitumen of the salt of an acylamido amine having at least one free amino group and an organo-substituted inorganic acid having at least one free ionizable hydrogen and at least 2 carbon atoms, said salt having at least 8 carbon atoms.

19. A composition substantially as described in claim 18, wherein the salt is present in an amount of about 0.1 to 2 per cent by weight of the bitumen.

20. A composition substantially as described in claim 18, wherein the bitumen is asphalt, the organo-substituted acid has at least 6 carbon atoms and the salt has at least 12 carbon atoms.

EDWARD W. MERTENS.
DON E. STEVENS.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,419,404 | Johnson | Apr. 22, 1947 |
| 2,426,220 | Johnson | Aug. 26, 1947 |
| 2,438,318 | Johnson | Mar. 23, 1948 |